United States Patent
Lee et al.

(10) Patent No.: US 7,778,008 B2
(45) Date of Patent: Aug. 17, 2010

(54) CAPACITOR STRUCTURE AND METHOD OF MANUFACTURING THE SAME

(75) Inventors: Keun-Bong Lee, Yongin-si (KR);
Jung-Hyeon Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 457 days.

(21) Appl. No.: 11/983,991

(22) Filed: Nov. 13, 2007

(65) Prior Publication Data

US 2008/0123244 A1    May 29, 2008

(30) Foreign Application Priority Data

Nov. 23, 2006    (KR) .................. 10-2006-0116352

(51) Int. Cl.
*H01G 4/005*    (2006.01)
*H01G 4/06*    (2006.01)

(52) U.S. Cl. .................. 361/303; 361/311; 29/25.42
(58) Field of Classification Search .................. 361/303, 361/311; 29/25.42
See application file for complete search history.

(56) References Cited

U.S. PATENT DOCUMENTS

| | | | |
|---|---|---|---|
| 5,208,725 A * | 5/1993 | Akcasu .................. 361/313 |
| 6,570,210 B1 * | 5/2003 | Sowlati et al. .............. 257/307 |
| 6,912,114 B2 | 6/2005 | Kim et al. | |
| 6,974,994 B1 | 12/2005 | Kuo et al. | |
| 2004/0031982 A1 | 2/2004 | Devries et al. | |
| 2006/0220080 A1 * | 10/2006 | Dubin et al. ................. 257/295 |
| 2007/0235838 A1 * | 10/2007 | Wang ......................... 257/532 |

FOREIGN PATENT DOCUMENTS

KR    10-2004-0015426 A    2/2004

* cited by examiner

*Primary Examiner*—Eric Thomas
(74) *Attorney, Agent, or Firm*—Mills & Onello, LLP

(57) ABSTRACT

In a capacitor structure and a method of manufacturing the capacitor structure, first and second conductive patterns are formed on a substrate. The first and second conductive patterns extend in a first direction. The first and second conductive patterns are alternately arranged to be spaced apart from one another in a second direction substantially perpendicular to the first direction. An insulating interlayer is formed on the substrate to cover the first and second conductive patterns. Third and fourth conductive patterns extending in a third direction lying at an angle of between about 0° and about 90° relative to the first direction are formed on the insulating interlayer. The third and fourth conductive patterns are alternately arranged to be spaced apart from one another in a fourth direction substantially perpendicular to the third direction.

20 Claims, 10 Drawing Sheets

FIG. 2
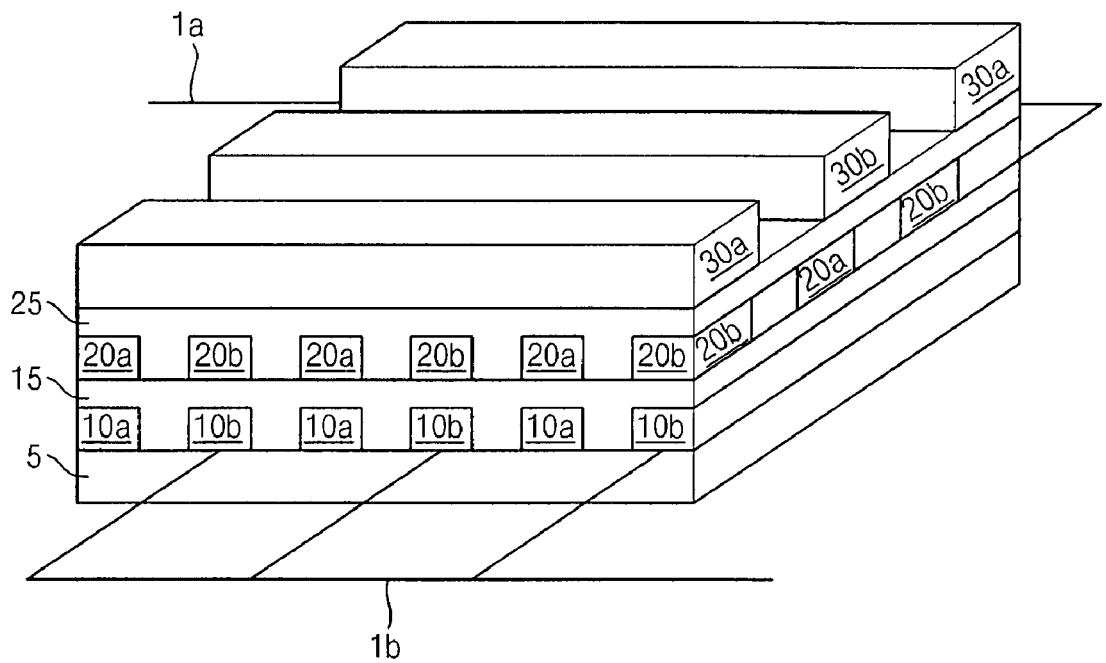
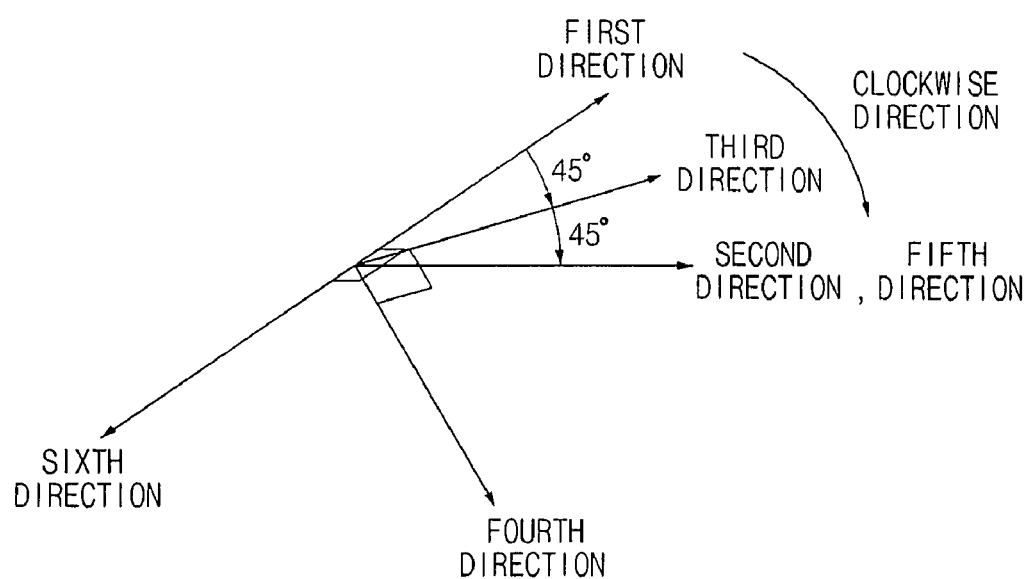

FIG. 3
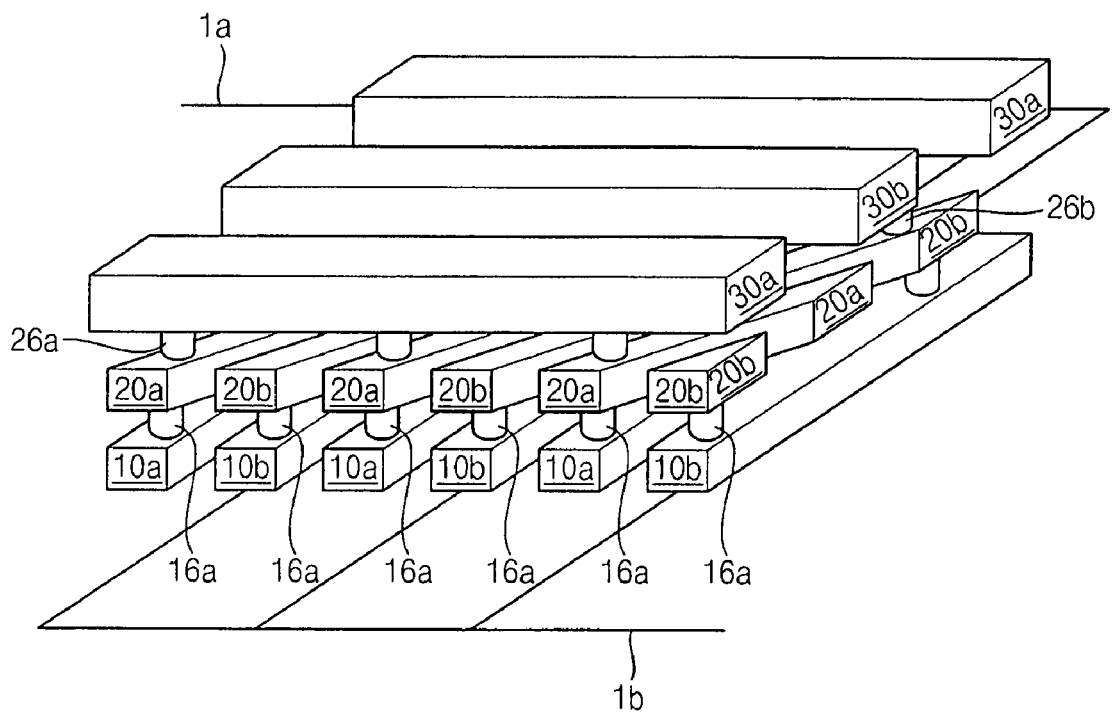
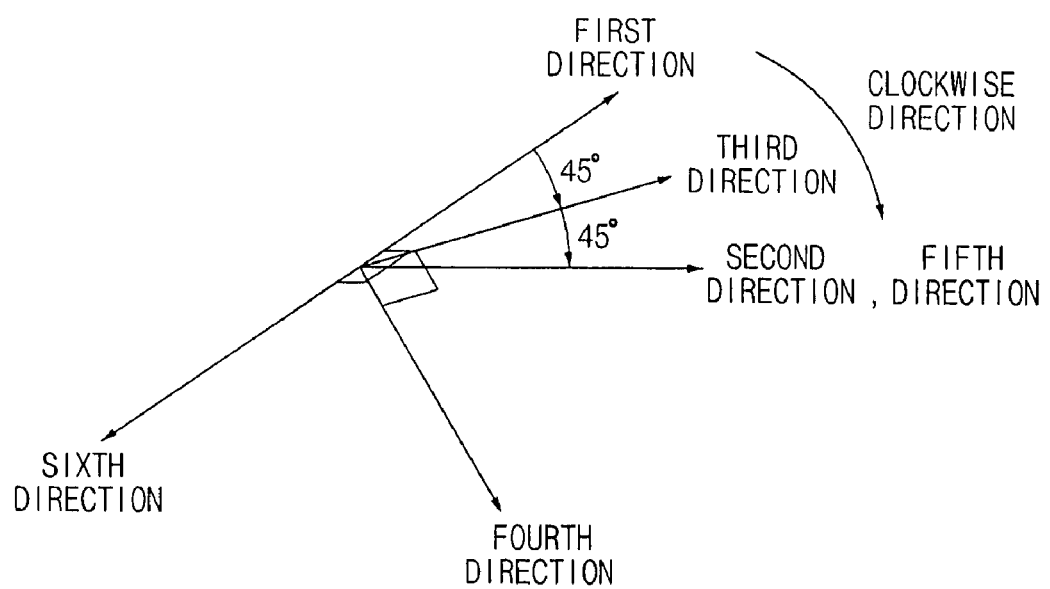

FIG. 4
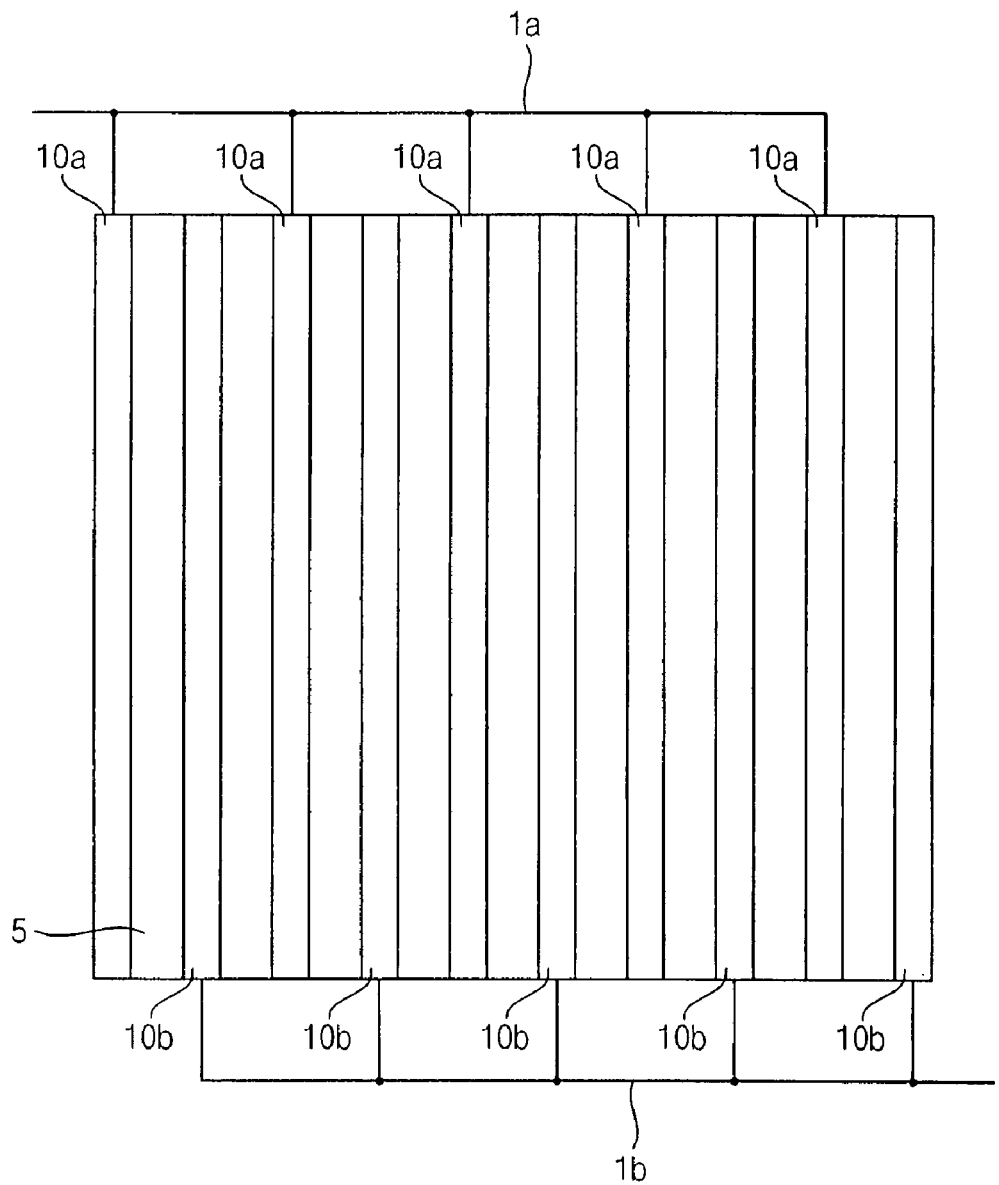
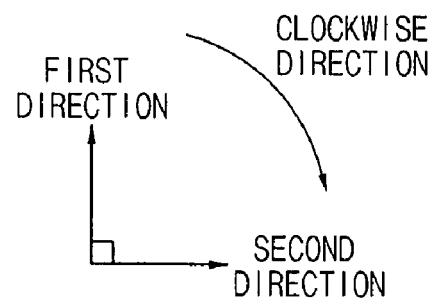

FIG. 6
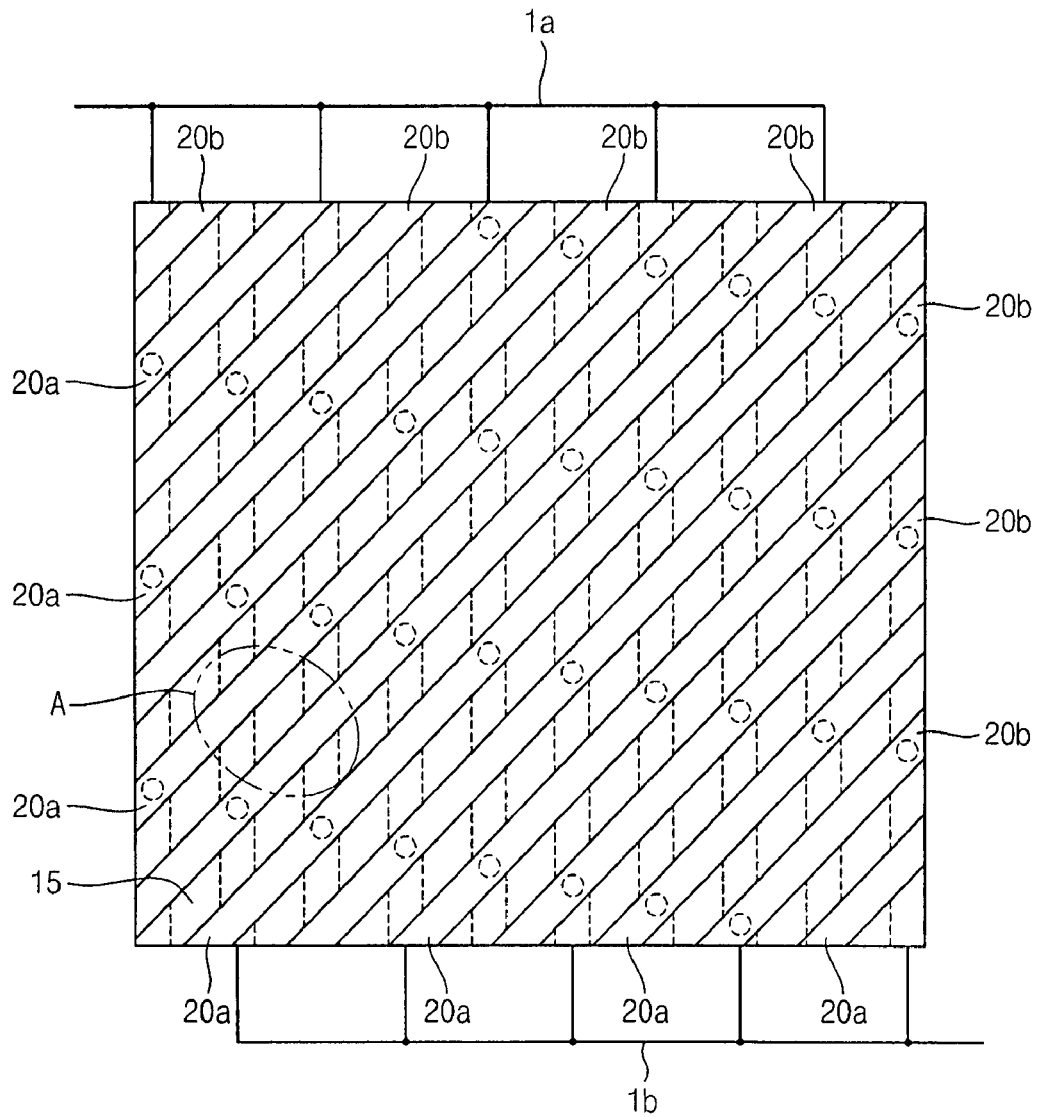
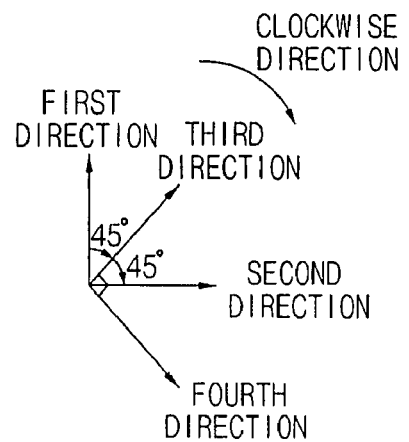

FIG. 8
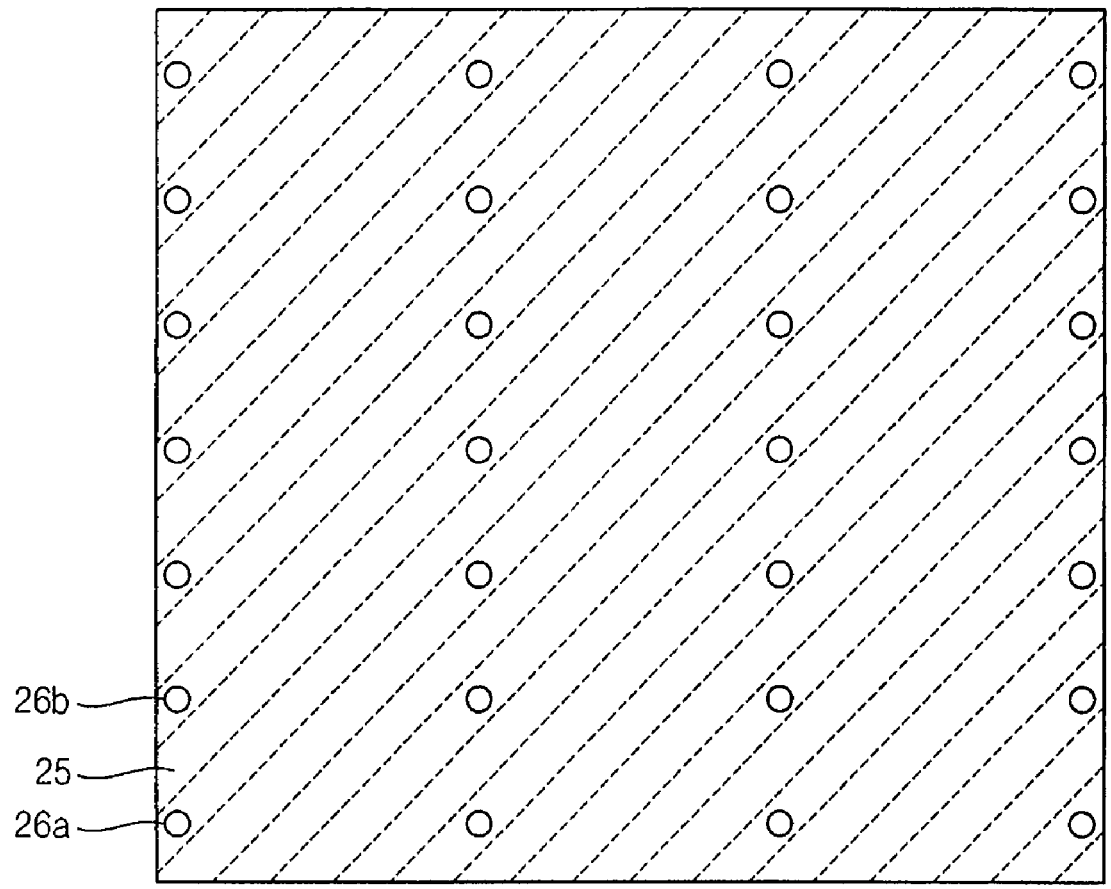
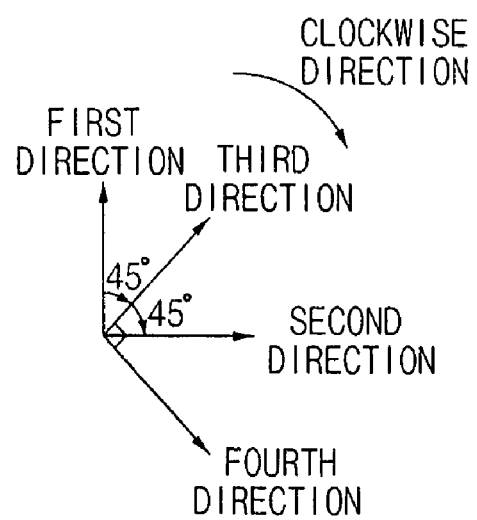

FIG. 9
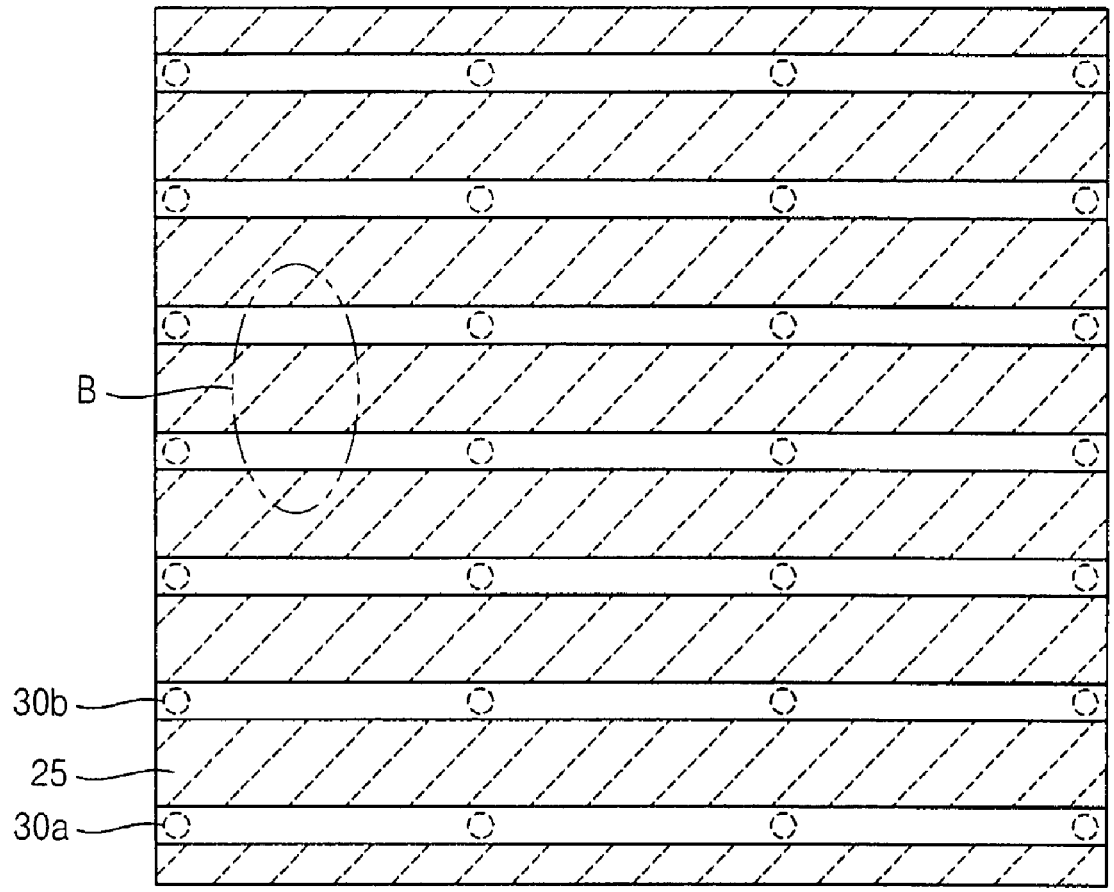
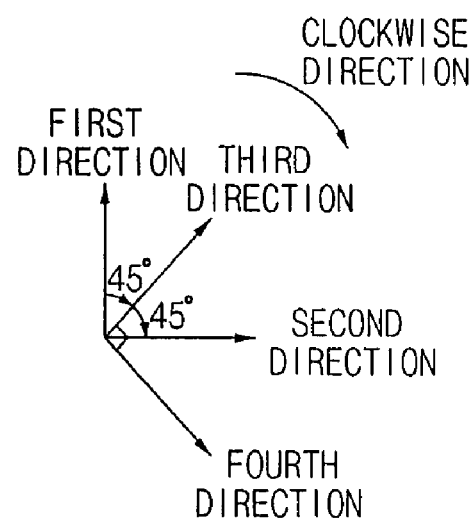

CAPACITOR STRUCTURE AND METHOD OF MANUFACTURING THE SAME

CROSS-REFERENCE TO RELATED APPLICATIONS

This application claims priority under 35 U.S.C. §119 to Korean Patent Application No. 10-2006-0116352, filed on Nov. 23, 2006 in the Korean Intellectual Property Office (KIPO), the disclosure of which is incorporated herein by reference in its entirety.

BACKGROUND OF THE INVENTION

1. Field of the Invention

The present invention relates to a capacitor structure. More particularly, the present invention relates to a capacitor structure capable of storing charge.

2. Description of the Related Art

FIG. 1 is a perspective view illustrating a conventional capacitor structure. Insulating portions of the capacitor structure are not depicted in FIG. 1 for convenience of explanation. That is, only conductive portions of the capacitor structure are depicted in FIG. 1.

Referring to FIG. 1, the conventional capacitor structure includes first conductive patterns 1a, second conductive patterns 1b, first contacts 3a, second contacts 3b, third conductive patterns 2a, fourth conductive patterns 2b, third contacts 4a and fourth contacts 4b.

The first conductive patterns 1a and the second conductive patterns 1b extend in a first direction. The first and second conductive patterns 1a and 1b are alternately arranged in a second direction substantially perpendicular to the first direction such that the first and second conductive patterns 1a and 1b are spaced apart from one another in the second direction.

The first conductive patterns 1a are vertically and repeatedly stacked. The first conductive patterns 1a are vertically connected by the first contacts 3a. The second conductive patterns 1b are vertically and repeatedly stacked. The second conductive patterns 1b are vertically connected by the second contacts 3b.

The third conductive patterns 2a and the fourth conductive patterns 2b are located over the first conductive patterns 1a and the second conductive patterns 1b. The third conductive patterns 2a and the fourth conductive patterns 2b extend in a second direction substantially perpendicular to the first direction. In addition, the third conductive patterns 2a and the fourth conductive patterns 2b are arranged to be spaced apart from one another in the first direction.

The third conductive patterns 2a are vertically connected to one another by the third contacts 4a. In addition, the fourth conductive patterns 2b are vertically connected to one another by the fourth contacts 4b. Thus, the first conductive patterns 1a, the first contacts 3a, the third conductive patterns 2a and the third contacts 4a form a first electric group. In addition, the second conductive patterns 1b, the second contacts 3b, the fourth conductive patterns 2b and the fourth contacts 4b form a second electric group that is electrically insulated from the first electric group.

The conventional capacitor structure includes a first capacitor, a second capacitor, a third capacitor and a fourth capacitor because the first electric group is electrically insulated from the second electric group. The first capacitor is horizontally formed between the first conductive patterns 1a and the second conductive patterns 1b. The second capacitor is horizontally formed between the third conductive patterns 2a and the fourth conductive patterns 2b. The third capacitor is vertically formed between the first conductive patterns 1a and the fourth conductive patterns 2b. The fourth capacitor is vertically formed between the second conductive patterns 1b and third conductive patterns 2a.

As described above, the first direction in which the first conductive patterns 1a and the second conductive patterns 1b extend is substantially perpendicular to the second direction in which the third conductive patterns 2a and the fourth, conductive patterns 2b extend.

Thus, portions of the first conductive patterns 1a and the fourth conductive patterns 2b that are overlapped and portions of the second conductive patterns 1b and the fourth conductive patterns 2a that are overlapped may be shaped substantially like rectangles or squares in the overlapping regions.

Capacitances of the third and fourth capacitors are substantially proportional to the areas of the overlapped portions, and as described above, the overlapped portions are shaped substantially like rectangles or squares. Thus, the capacitances of the third and fourth capacitors are limited by the rectangular areas of intersection.

In addition, when the first, second, third and fourth conductive patterns are vertically and repeatedly stacked, the first, second, third and fourth conductive patterns cannot be rotated. Thus, the resulting number of third and fourth capacitors is not large.

SUMMARY OF THE INVENTION

An embodiment of the present invention provides a capacitor structure including a large number of capacitors having relatively large capacitance values.

An embodiment of the present invention provides a method of manufacturing the capacitor structure.

In accordance with an embodiment of the present invention, a capacitor structure includes a substrate, first conductive patterns, second conductive patterns, an insulating interlayer, third conductive patterns and fourth conductive patterns. The first and second conductive patterns extend in a first direction on the substrate. The first and second conductive patterns are alternately arranged to be spaced apart from one another in a second direction substantially perpendicular to the first direction. The insulating interlayer is formed on the substrate to cover the first and second conductive patterns. The third and fourth conductive patterns extend on the insulating interlayer in a third direction that lies at an angle of between about 0° and about 90° relative to the first direction. The third and fourth conductive patterns are alternately arranged to be spaced apart from one another in a fourth direction substantially perpendicular to the third direction.

The first conductive patterns may be electrically connected to one another, the second conductive patterns electrically connected to one another. The first conductive patterns may be electrically connected to one another by a first conductive line connected to end portions of the first conductive patterns. The second conductive patterns may be electrically connected to one another by a second conductive line connected to end portions of the second conductive patterns.

The first conductive patterns may be electrically connected to the third conductive patterns. The second conductive patterns may be electrically connected to the fourth conductive patterns. The first and third conductive patterns may be electrically connected to one another by first contacts formed between the first and third conductive patterns through the insulating interlayer. The second and fourth conductive patterns may be electrically connected to one another by second contacts formed between the second and fourth conductive patterns through the insulating interlayer.

The third conductive patterns may be electrically connected to one another by a third conductive line connected to end portions of the third conductive patterns. The third conductive line may be electrically connected to the first conductive line. The fourth conductive patterns may be electrically connected to one another by a fourth conductive line connected to end portions of the fourth conductive patterns. The fourth conductive line may be electrically connected to the second conductive line.

The angle may be about 45°. The first, second, third and fourth conductive patterns may have substantially bar shapes. The insulating interlayer and the third and fourth conductive patterns may be subsequently and repeatedly stacked. Here, each time the third and fourth conductive patterns are stacked, the stacked conductive patterns are rotated by between about 0° and about 90° relative to conductive patterns on a neighboring lower level.

In accordance with an embodiment of the present invention, there is provided a method of manufacturing a capacitor structure. In the method, first and second conductive patterns are formed on the substrate. The first and second conductive patterns extend in a first direction. The first and second conductive patterns are alternately arranged to be spaced apart from one another in a second direction substantially perpendicular to the first direction. An insulating interlayer is formed on the substrate to cover the first and second conductive patterns. Third and fourth conductive patterns extending in a third direction that lies at an angle of between about 0° and about 90° relative to the first direction are formed. The third and fourth conductive patterns are alternately arranged to be spaced apart from one another in a fourth direction substantially perpendicular to the third direction.

A first conductive line may be further formed as one body with the first conductive patterns such that the first conductive line is connected to end portions of the first conductive patterns. A second conductive line may be further formed as one body with the second conductive patterns such that the second conductive line is connected to end portions of the second conductive patterns.

First contacts may be further formed through the insulating interlayer such that the first contacts are connected between the first and third conductive patterns. Second contacts may be further formed through the insulating interlayer such that the second contacts are connected between the second and fourth conductive patterns.

A third conductive line may be further formed as one body with the third conductive patterns such that the third conductive line is connected to end portions of the third conductive patterns. Here, the third conductive line may be electrically connected to the first conductive line.

A fourth conductive line may be further formed as one body with the fourth conductive patterns such that the fourth conductive line is electrically connected to end portions of the fourth conductive patterns. Here, the fourth conductive line may be electrically connected to the second conductive line.

The angle may be about 45°. The first, second, third and fourth conductive patterns may have substantially bar shapes. The insulating interlayer and the third and fourth conductive patterns may be subsequently and repeatedly stacked. Here, each time the third and fourth conductive patterns are stacked, the stacked third and fourth conductive patterns may be rotated by between about 0° and about 90° relative to conductive patterns on a neighboring lower level.

According to embodiments of the present invention, areas of portions where two conductive patterns forming a capacitor are overlapped may be increased. The capacitance of the capacitor may be substantially proportional to the areas of the overlapped portions, and the resulting capacitance of the capacitor can therefore be increased.

In addition, each time the conductive patterns are vertically and repeatedly stacked, the stacked conductive patterns are rotated by a predetermined angle with respect to the lower conductive patterns. Thus, the number of capacitors may be increased.

BRIEF DESCRIPTION OF THE DRAWINGS

The above and other advantages of the embodiments of the present invention will become readily apparent by reference to the following detailed description when considered in conjunction with the accompanying drawings in which:

FIG. 2 is a perspective view illustrating a capacitor structure in accordance with an embodiment of the present invention;

FIG. 3 is a perspective view illustrating conductive portions of the capacitor structure in FIG. 2; and FIGS. 4 to 10 are plan views illustrating a method of manufacturing a capacitor of the type shown in FIGS. 2 and 3.

DETAILED DESCRIPTION OF EMBODIMENTS

Figure 1:
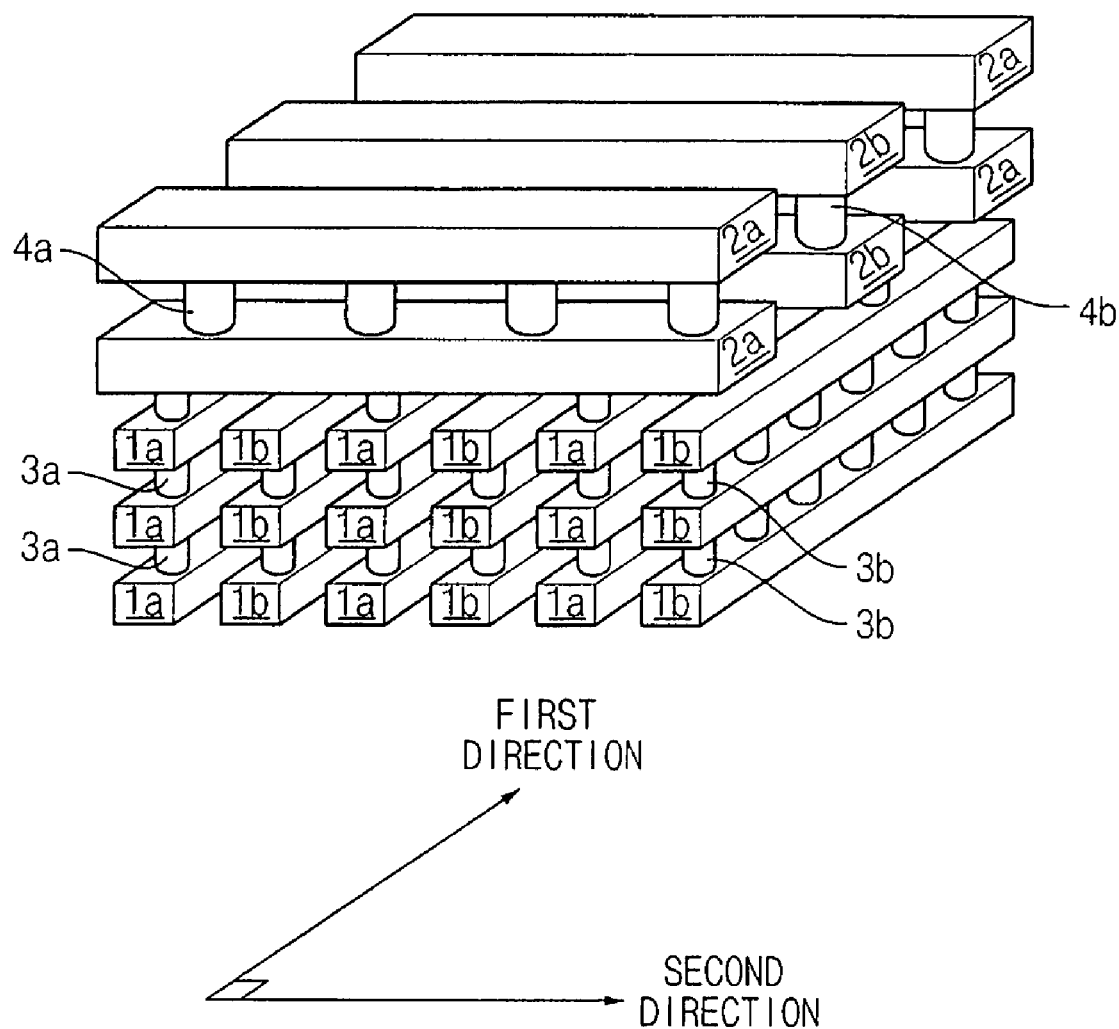
FIG. 1 is a perspective view illustrating a conventional capacitor structure.

Embodiments of the present invention will be described with reference to the accompanying drawings. The present invention may, however, be embodied in many different forms and should not be construed as limited to the embodiments set forth herein. Rather, the embodiments are provided so that disclosure of the present invention will be thorough and complete, and will fully convey the scope of the present invention to those skilled in the art. The principles and features of this invention may be employed in varied and numerous embodiments without departing from the scope of the present invention. In the drawings, the size and relative sizes of layers and regions may be exaggerated for clarity. The drawings are not necessarily to scale. Like reference numerals designate like elements throughout the drawings.

It will also be understood that when an element or layer is referred to as being "on," "connected to" and/or "coupled to" another element or layer, the element or layer may be directly on, connected and/or coupled to the other element or layer or intervening elements or layers may be present. In contrast, when an element is referred to as being "directly on," "directly connected to" and/or "directly coupled to" another element or layer, no intervening elements or layers are present. As used herein, the term "and/or" may include any and all combinations of one or more of the associated listed items.

It will also be understood that, although the terms first, second, etc. may be used herein to describe various elements, components, regions, layers and/or sections. These elements, components, regions, layers and/or sections should not be limited by these terms. These terms may be used to distinguish one element, component, region, layer and/or section from another element, component, region, layer and/or section. For example, a first element, component, region, layer and/or section discussed below could be termed a second element, component, region, layer and/or section without departing from the teachings of the present invention.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

The terminology used herein is for the purpose of describing particular embodiments only and is not intended to be limiting of the invention. As used herein, the singular terms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

Unless otherwise defined, all terms (including technical and scientific terms) used herein may have the same meaning as what is commonly understood by one of ordinary skill in the art. It will be further understood that terms, such as those defined in commonly used dictionaries, should be interpreted as having a meaning that is consistent with their meaning in the context of this specification and the relevant art and will not be interpreted in an idealized and/or overly formal sense unless expressly so defined herein.

Embodiments of the present invention are described with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated as a rectangle will, typically, have rounded or curved features. Thus, the regions illustrated in the figures are schematic in nature of a device and are not intended to limit the scope of the present invention.

FIG. 2 is a perspective view illustrating a capacitor structure in accordance with an embodiment of the present invention. FIG. 3 is a perspective view illustrating conductive portions of the capacitor structure in FIG. 2. That is, insulating portions of the capacitor structure in FIG. 2 are not depicted in FIG. 3 for convenience of explanation.

Referring to FIGS. 2 and 3, first and second conductive patterns 10a and 10b are provided on a substrate 5, for example an insulating layer 5. For example, the first and second conductive patterns 10a and 10b can include a metal such as copper (Cu), aluminum (Al) or platinum (Pt). These metals can be used alone or in combination in a metal alloy.

The first and second conductive patterns 10a and 10b extend in a first direction on the insulating layer 5. The first and second conductive patterns 10a and 10b are alternately arranged on the insulating layer 5 such that the first and second conductive patterns 10a and 10b are spaced apart from one another in a second direction, the second direction being a direction that is rotated clockwise relative to the first direction by about 90°.

The first and second conductive patterns 10a and 10b may have various shapes. For example, as illustrated in FIGS. 2 and 3, the first and second conductive patterns 10a and 10b can have substantially bar shapes.

The first conductive patterns 10a may be electrically connected to one another by a first conductive line 1a connected to end portions of the first conductive patterns 10a. Here, the first conductive line 1a can be integrally formed with the first conductive patterns 10a. Alternatively, the first conductive line 1a and the first conductive patterns 10a can be formed by different processes.

The second conductive patterns 10b may be electrically connected to one another by a second conductive line 1b connected to end portions of the second conductive patterns 10b. Here, the second conductive line 1b may be integrally formed with the second conductive patterns 10b. Alternatively, the second conductive line 1b and the second conductive patterns 10b may be formed by different processes.

That is, the first conductive patterns 10a are electrically connected to one another by the first conductive line 1a. In addition, the second conductive patterns 10b are electrically connected to one another by the second conductive line 1b. The first conductive patterns 10a are electrically insulated from the second conductive patterns 10b.

A first insulating interlayer 15 is provided on the insulating layer 5 such that the first insulating interlayer 15 covers the first and second conductive patterns 10a and 10b. The first insulating interlayer 15 can comprise an insulating material such as silicon nitride or silicon oxide.

As described above, the first conductive patterns 10a are electrically insulated from the second conductive patterns 10b. In addition, a space between the first conductive patterns 10a and the second conductive patterns 10b is filled with the first insulating interlayer 15. Thus, the first conductive patterns 10a, the first insulating interlayer 15 and the second conductive patterns 10b may form a capacitor that is configured in a horizontal direction.

Third conductive patterns 20a and fourth conductive patterns 20b are provided on the first insulating interlayer 15. For example, the third and fourth conductive patterns 20a and 20b can be formed using a metal such as copper (Cu), aluminum (Al) or platinum (Pt). These metals may be used alone or in combination in a metal alloy.

The third and fourth conductive patterns 20a and 20b may extend in a third direction forming a first angle $\theta 1$ to the first direction. The third and fourth conductive patterns 20a and 20b are alternately arranged such that the third and fourth conductive patterns 20a and 20b are spaced apart from one another in a fourth direction that is rotated clockwise relative to the third direction by about 90°.

Here, the first angle $\theta 1$ can be between about 0° and about 90°, so that it is an acute angle. In addition, the third direction may lie at the first angle $\theta 1$ relative to the first direction in a clockwise direction. Alternatively, the third direction may lie at the first angle $\theta 1$ relative to the first direction in a counter-clockwise direction.

In the present embodiment, a case where the third direction is at an angle of about 45° relative to the first direction in the clockwise direction is described for convenience of explanation. However, as described above, the present invention is not construed as being limited to the present embodiment.

The third and fourth conductive patterns 20a and 20b may have various shapes. For example, as illustrated in FIGS. 2, 3, and 6, the third and fourth conductive patterns 20a and 20b can have substantially bar shapes.

First and second contacts 16a and 16b are formed through the first insulating interlayer 15. The first and second contacts 16a and 16b may be formed using a conductive metal such as tungsten (W) or copper (Cu). These metals may be used alone or in combination in an alloy.

Particularly, the first contacts 16a may be formed through portions of the first insulating interlayer 15 where the first conductive patterns 10a and the third conductive patterns 20a are overlapped such that the first contacts 16a electrically connect the first conductive patterns 10a to the third conductive patterns 20a. The second contacts 16b may be formed through portions of the first insulating interlayer 15 where the second conductive patterns 10b and the fourth conductive patterns 20b are overlapped such that the second contacts 16b electrically connect the second conductive patterns 10b to the fourth conductive patterns 20b.

Alternatively, the first contacts 16a are not formed. In this case, a third conductive line electrically connected to end portions of the third conductive patterns 20a is formed, and third conductive line is electrically connected to the first conductive line 1a.

In addition, in an alternative embodiment, the second contacts 16b are not formed. In this case, a fourth conductive line electrically connected to end portions of the fourth conductive patterns 20b is formed. The fourth conductive line is electrically connected to the second conductive line 1b.

The first conductive patterns 10a are not electrically connected to the fourth conductive patterns 20b. The second conductive patterns 10b are not electrically connected to the third conductive patterns 20a.

That is, the first and third conductive patterns 10a and 20a electrically connected to one another may form an electric group. In addition, the second and fourth conductive patterns 10b and 20b electrically connected to one another may form another electric group.

The first insulating interlayer 15 and the second conductive patterns 10b are located under the third conductive patterns 20a; also the first insulating interlayer 15 and the first conductive patterns 10a are located under the fourth conductive patterns 20b.

As described above, the third conductive patterns 20a, the first insulating interlayer 15 and the second conductive patterns 10b can form a capacitor structure in the vertical direction because the third conductive patterns 20a are electrically insulated from the second conductive patterns 10b. Also, the fourth conductive patterns 20b, the first insulating interlayer 15 and the first conductive patterns 10a can form a capacitor structure in the vertical direction because the fourth conductive patterns 20b are electrically insulated from the first conductive patterns 10a.

Here, portions where the third conductive patterns 20a and the second conductive patterns 10b are overlapped and portions where the fourth conductive patterns 20b and the first conductive patterns 10a are overlapped may be shaped substantially like parallelograms other than a square and a rectangle because the first direction lies at the first acute angle θ1 relative to the third direction.

That is, the portion where the third conductive patterns 20a and the second conductive patterns 10b are overlapped and the portion where the fourth conductive patterns 20b and the first conductive patterns 10a are overlapped may be shaped substantially like parallelograms having an acute interior angle. Here, the acute interior angle is the first angle θ1.

In the present embodiment, the acute interior angle of the parallelogram is about 45° because the third direction lies at an angle of about 45° relative to the first direction in the clockwise direction.

The capacitance of a capacitor is substantially proportional to the areas of the overlapped portions. As described above, the overlapped portions are shaped substantially like the parallelogram having the acute interior angle. Thus, the capacitance may be increased as compared to a case where the overlapped portions are shaped substantially like the square and the rectangle, since the area of the overlapped portions shaped like a parallelogram is greater than the area of the overlapped portions shaped like the rectangle or square, assuming the same width of conductive patterns in each case.

A second insulating interlayer 25 is provided on the first insulating interlayer 15 to cover the third and fourth conductive patterns 20a and 20b. The second insulating interlayer 25 can include substantially the same insulating material as the first insulating interlayer 15.

As described above, the third conductive patterns 20a and fourth conductive patterns 20b are electrically insulated from one another. In addition, the space between the third conductive patterns 20a and the fourth conductive patterns 20b is filled with the second insulating interlayer 25. Thus, the third conductive patterns 20a, the second insulating interlayer 25 and the fourth conductive patterns 20b form a capacitor in a horizontal direction.

Fifth and sixth conductive patterns 30a and 30b are located on the second insulating interlayer 25. For example, the fifth and sixth conductive patterns 30a and 30b can be formed of the same conductive metal or metal alloy as that of the third and fifth conductive patterns 20a and 20b.

The fifth and sixth conductive patterns 30a and 30b extend in a fifth direction that lies at a second angle θ2 relative to the third direction. The fifth and sixth conductive patterns 30a and 30b are alternately arranged to be spaced apart from one another in a sixth direction that is rotated clockwise relative to the fifth direction by about 90°.

Here, the second angle θ2 may be an acute angle between about 0° and about 90°. In addition, the fifth direction may lie at the second angle θ2 relative to the third direction in a clockwise direction. Alternatively, the fifth direction may lie at the second angle θ2 relative to the third direction in a counterclockwise direction.

In the present embodiment, a case where the fifth direction lies at an angle of about 45° relative to the third direction in a clockwise direction is described for the convenience of explanation. In this example, the fifth direction can be substantially the same as the second direction because the fifth direction lies at an angle of about 45° relative to the third direction in the clockwise direction.

The fifth and sixth conductive patterns 30a and 30b can be formed to have various shapes. For example, as illustrated in FIGS. 2, 3, and 9, the fifth and sixth conductive patterns 30a and 30b may have substantially bar shapes.

Third and fourth contacts 26a and 26b are provided through the second insulating interlayer 25. The third and fourth contacts 26a and 26b may include the same metal as that of the first and second contacts 16a and 16b.

Particularly, the third contacts 26a may be formed through portions of the second insulating interlayer 25 where the third conductive patterns 20a and the fifth conductive patterns 30a are overlapped such that the third contacts 26a electrically connect the third conductive patterns 20a to the fifth conductive patterns 30a. The fourth contacts 26b may be formed through portions of the second insulating interlayer 25 where the fourth conductive patterns 20b and the sixth conductive patterns 30b are overlapped such that the fourth contacts 26b electrically connect the fourth conductive patterns 20b to the sixth conductive patterns 30b.

In an alternative embodiment, the third contacts 26a are not formed. In this case, a fifth conductive line electrically connected to end portions of the fifth conductive patterns 30a is formed. The fifth conductive line can be electrically connected to the first conductive line 1a. In addition, in the alternative embodiment, the fourth contacts 26b are not formed. In this case, a sixth conductive line electrically connected to end portions of the sixth conductive patterns 30b is formed. The sixth conductive line can be electrically connected to the second conductive line 1b.

The third conductive patterns 20a are insulated from, and are not electrically connected to, the sixth conductive patterns 30b. The fourth conductive patterns 20b are insulated from, and are not electrically connected to, the fifth conductive patterns 30a. That is, the first, third and fifth conductive patterns 10a, 20a and 30a electrically connected to one another may form an electric group. The second, fourth and sixth conductive patterns 10b, 20b and 30b electrically connected to one another may form another electric group.

The second insulating interlayer 25 and the fourth conductive patterns 20b are located under the fifth conductive patterns 30a. The second insulating interlayer 25 and the second conductive patterns 20a are located under the sixth conductive patterns 30b. The fifth conductive patterns 30a, the second insulating interlayer 25 and the fourth conductive patterns 20b form a capacitor in the vertical direction because the fifth conductive patterns 30a are electrically insulated from the fourth conductive patterns 20b. The sixth conductive patterns 30b, the second insulating interlayer 25 and the third conductive patterns 20a form a capacitor structure in the vertical direction because the sixth conductive patterns 30b are electrically insulated from the third conductive patterns 20a.

Here, portions where the fifth conductive patterns 30a and the fourth conductive patterns 20b are overlapped and portions where the sixth conductive patterns 30b and the third conductive patterns 20a are overlapped may be shaped substantially like parallelograms other than a square and a rectangle because the third direction lies at the second angle θ2 relative to the fifth direction.

That is, portions where the fifth conductive patterns 30a and the fourth conductive patterns 20b are overlapped and portions where the sixth conductive patterns 30b and the third conductive patterns 20a are overlapped may be shaped substantially like parallelograms having an acute interior angle. In this case, the acute angle interior angle is the second angle θ2.

In the present embodiment, the parallelogram has an acute interior angle of about 45° because the fifth direction lies at an angle of about 45° relative to the third direction in a clockwise direction. As described above, the overlapped portions are shaped substantially like the parallelogram having the acute interior angle. Thus, the capacitance may be increased relative to a case where the overlapped portions are shaped substantially like a square or rectangle, assuming conductive patterns of the same width.

In the present embodiment, the conductive patterns are vertically stacked three times. In addition, the stacked conductive patterns are rotated by a predetermined angle, such as an acute angle, with respect to the lower conductive patterns so that the shape of the overlapped portions becomes the parallelogram having a relatively increased area, and therefore capable of increasing the capacitance of the resulting device. In various embodiments, the conductive patterns may be vertically stacked, for example, at least six times. In this case also, each time the conductive patterns are stacked, the subsequently stacked conductive patterns are rotated by the predetermined angle with respect to the preceding lower conductive patterns.

FIGS. 4 to 10 are plan views illustrating a method of manufacturing a capacitor, for example, the capacitor shown in FIGS. 2 and 3.

Referring to FIG. 4, first and second conductive patterns 10a and 10b are formed on an insulating layer 5. For example, the first and second conductive patterns 10a and 10b may be formed using a metal such as copper (Cu), aluminum (Al) or platinum (Pt). These metals may be used alone or in combination in an alloy.

The first and second conductive patterns 10a and 10b extend in a first direction on the insulating layer 5. The first and second conductive patterns 10a and 10b are alternately arranged on the insulating layer 5 to be spaced apart from one another in a second direction rotated clockwise from the first direction by about 90°.

The first and second conductive patterns 10a and 10b may have various shapes. For example, as illustrated in FIG. 4, the first and second conductive patterns 10a and 10b can have substantially bar shapes.

The first conductive patterns 10a may be electrically connected to one another by a first conductive line 1a connected to end portions of the first conductive patterns 10a. Here, the first conductive line 1a may be integrally formed with the first conductive patterns 10a. Alternately, the first conductive line 1a and the first conductive patterns 10a may be formed by different processes.

The second conductive patterns 10b are electrically connected to one another by a second conductive line 1b connected to end portions of the second conductive patterns 10b. Here, the second conductive line 1b may be integrally formed with the second conductive patterns 10b. Alternatively, the second conductive line 1b and the second conductive patterns 10b may be formed by different processes.

That is, the first conductive patterns 10a are electrically connected to one another by the first conductive line 1a. In addition, the second conductive patterns 10b are electrically connected to one another by a second conductive line 1b. However, the first conductive patterns 10a are electrically insulated from the second conductive patterns 10b.

Figure 5:
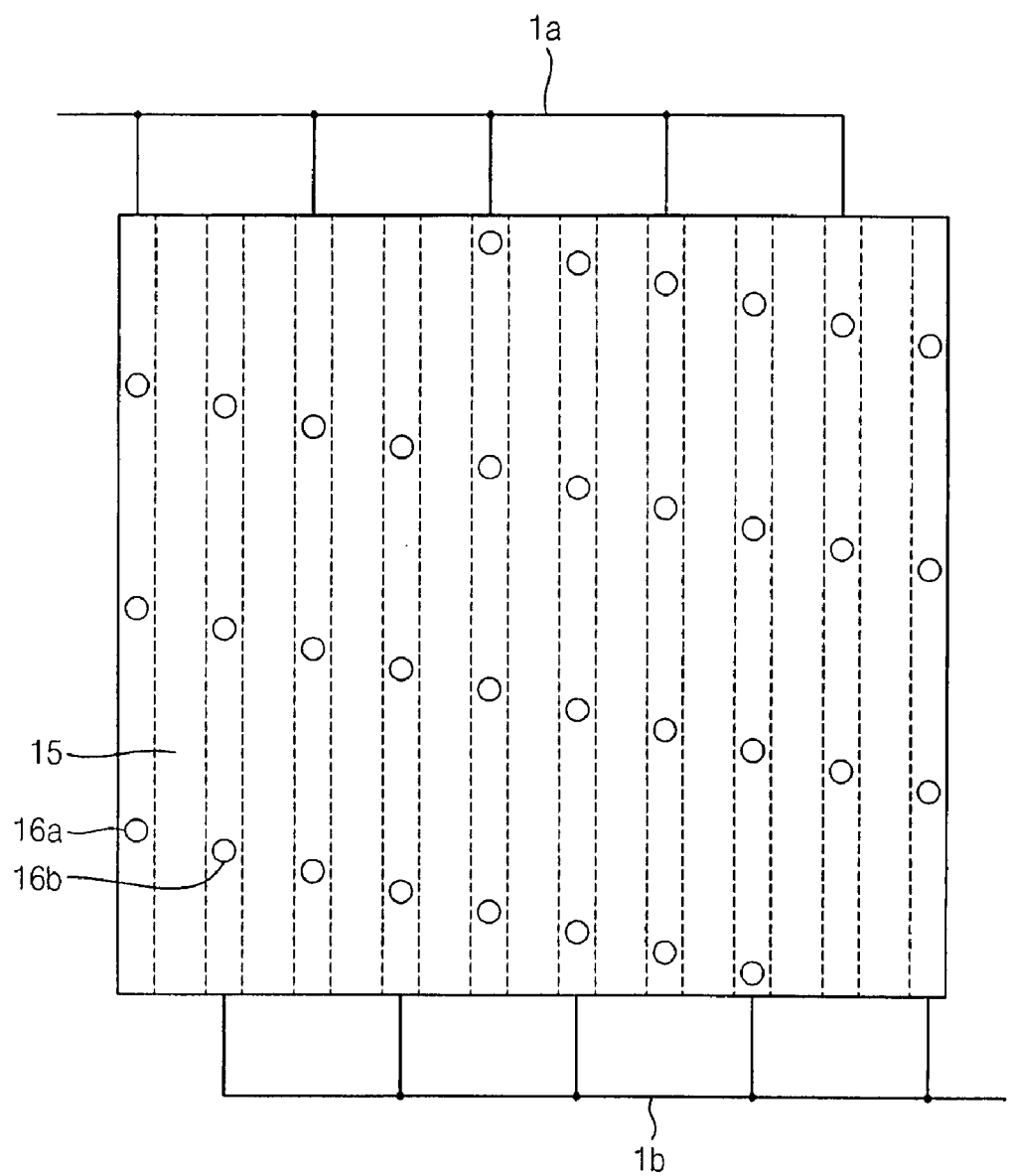

Referring to FIG. 5, a first insulating interlayer 15 is formed on the insulating layer 5 to cover the first and second conductive patterns 10a and 10b. The first insulating interlayer 15 may be formed using an insulating material such as silicon nitride and silicon oxide.

As described above, the first conductive patterns 10a are electrically insulated from the second conductive patterns 10b. In addition, a space between the first conductive patterns 10a and the second conductive patterns 10b is filled with the first insulating interlayer 15. Thus, the first conductive patterns 10a, the first insulating interlayer 15 and the second conductive patterns 10b form a capacitor structure in a horizontal direction.

After, the first insulating interlayer 15 is formed, first and second contacts 16a and 16b are formed through the first insulating interlayer 15 to be electrically connected to the first and second conductive patterns 10a and 10b, respectively. The first and second contacts 16a and 16b may include a metal such as tungsten (W) or copper (Cu). These metals may be used alone or in combination in an alloy.

Particularly, the first contacts 16a may be formed on portions of the first conductive patterns 10a to be overlapped by third conductive patterns 20a (see FIG. 6) that are subsequently formed. In addition, the second contacts 16b are formed on portions of the second conductive patterns 10b to be overlapped by fourth conductive patterns 20a (see FIG. 6) that are subsequently formed.

Referring to FIG. 6, the third conductive patterns 20a and the fourth conductive patterns 20b are formed on the first insulating interlayer 15. For example, the third and fourth conductive patterns 20a and 20b may be formed using a metal such as copper (Cu), aluminum (Al) or platinum (Pt). These metals may be used alone or in combination in an alloy.

The third and fourth conductive patterns 20a and 20b extend in a third direction that is at a first angle $\theta 1$ relative to the first direction. The third and fourth conductive patterns 20a and 20b are alternately arranged to be spaced apart from one another in a fourth direction that is rotated clockwise relative to the third direction by about 90°.

Here, the first angle $\theta 1$ may be an acute angle between about 0° and about 90°. In addition, the third direction may form the first angle $\theta 1$ from the first direction in a clockwise direction. Alternatively, the third direction may form the first angle $\theta 1$ from the first direction in a counterclockwise direction.

In the present embodiment, a case where the third direction forms about 45° to the first direction in the clockwise direction is described for convenience of explanation. However, as described above, the present invention is not to be construed as being limited to the present embodiment.

The third and fourth conductive patterns 20a and 20b may have various shapes. For example, as illustrated in FIG. 6, the third and fourth conductive patterns 20a and 20b have substantially bar shapes.

Here, the first conductive patterns 10a (see FIG. 8) and the third conductive patterns 20a are electrically connected to each other by the first contacts 16a (see FIG. 5). The second conductive patterns 10b and the fourth conductive patterns 20b are electrically connected to each other by the second contacts 16b.

In an alternative embodiment, the first contacts 16a are not formed. In this case, a third conductive line connected to end portions of the third conductive patterns 20a is formed. The third conductive line is then connected to the first conductive line 1a. In addition, in the alternative embodiment, the second contacts 16b are not formed. In this case, a fourth conductive line connected to end portions of the fourth conductive patterns 20b is formed. The fourth conductive line is then connected to the second conductive line 1b.

The first conductive patterns 10a are not electrically connected to the fourth conductive patterns 20a. In addition, the second conductive patterns 10b are not electrically connected to the third conductive patterns 20a.

That is, the first and third conductive patterns 10a and 20a that are electrically connected to one another may form an electric group. In addition, the second and fourth conductive patterns 10b and 20b that are electrically connected to one another may form another electric group.

Figure 7:
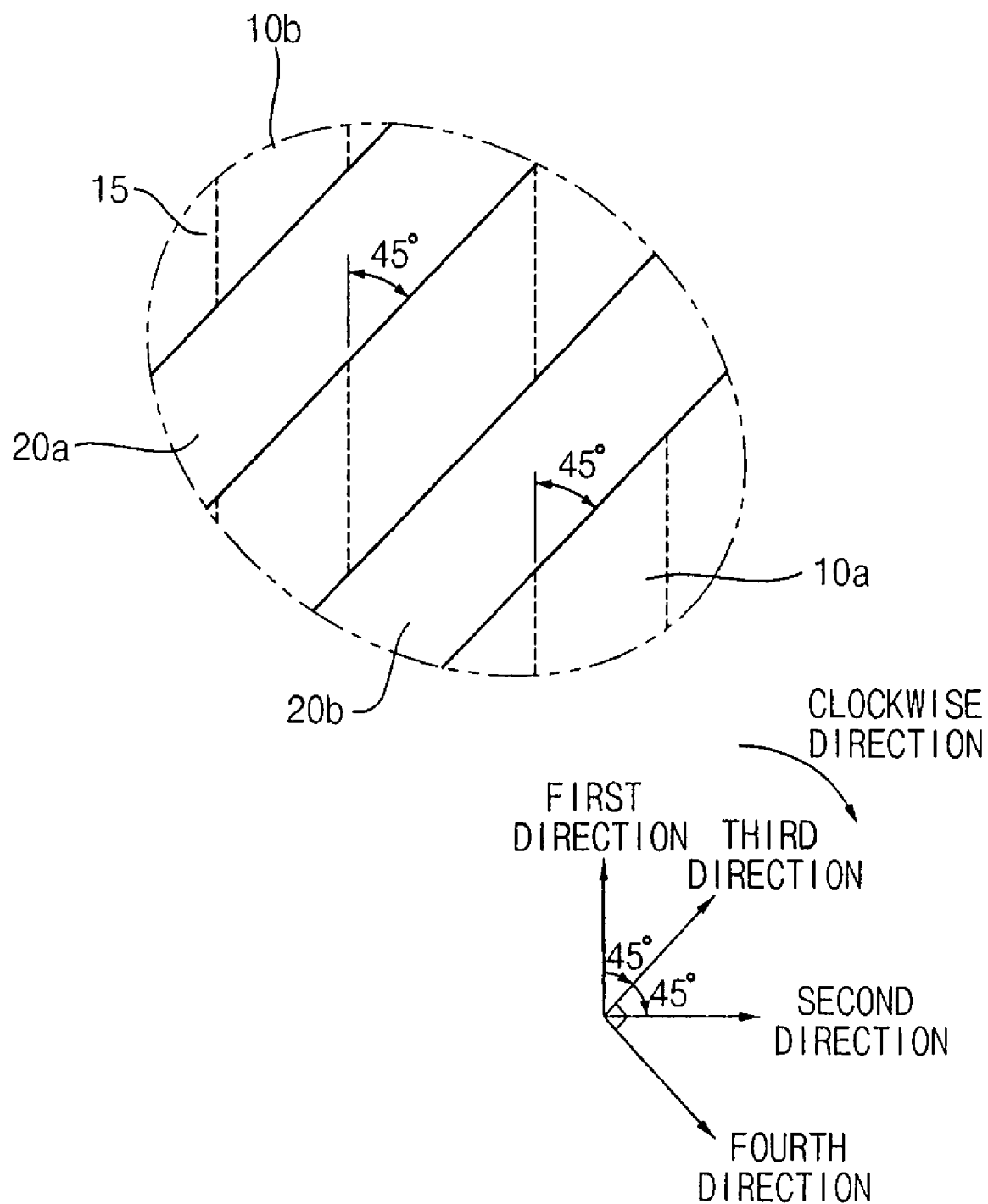

FIG. 7 is an enlarged view of portion "A" of FIG. 6.

Referring to FIG. 7, the first insulating interlayer 15 and the second conductive patterns 10b are subsequently located under the third conductive patterns 20a. The first insulating interlayer 15 and the first conductive patterns 10a are subsequently located under the fourth conductive patterns 20b.

As described above, the third conductive patterns 20a, the first insulating interlayer 15 and the second conductive patterns 10b can form a capacitor structure in a vertical direction because the third conductive patterns 20a are electrically insulated from the second conductive patterns 10b. The fourth conductive patterns 20b, the first insulating interlayer 15 and the first conductive patterns 10a can also vertically form a capacitor structure, because the fourth conductive patterns 20b are electrically insulated from the first conductive patterns 10a.

Here, portions where the third conductive patterns 20a and the second conductive patterns 10b are overlapped and portions where the fourth conductive patterns 20b and the first conductive patterns 10a are overlapped may be shaped substantially like parallelograms other than a square and a rectangle because the first direction lies at the first angle $\theta 1$ relative to the third direction. That is, the portion where the third conductive patterns 20a and the second conductive patterns 10b are overlapped and the portion where the fourth conductive patterns 20b and the first conductive patterns 10a are overlapped may be shaped substantially like parallelograms having an acute interior angle. Here, the acute interior angle may be the first angle $\theta 1$.

In the present embodiment, the acute interior angle of the parallelogram is about 45° because the third direction lies at an angle of about 45° relative to the first direction in a clockwise direction.

The capacitance of a capacitor is substantially proportional to areas of the overlapped portions. As described above, the overlapped portions are shaped substantially like the parallelogram having the acute interior angle. Thus, the capacitance may be relatively increased as compared to a case where the overlapped portions are shaped substantially like the square and the rectangle, owing to the increased area of overlap.

Referring to FIG. 8, a second insulating interlayer 25 can be formed on the first insulating interlayer 15 to cover the third and fourth conductive patterns 20a and 20b. The second insulating interlayer 25 may be formed using the same insulating material as that of the first insulating interlayer 15.

As described above, the third conductive patterns 20a are electrically insulated from the fourth conductive patterns 20b. In addition, a space between the third conductive patterns 20a and the fourth conductive patterns 20b is filled with the second insulating interlayer 25. Thus, the third conductive patterns 20a, the second insulating interlayer 25 and the fourth conductive patterns 20b can form a capacitor structure in a horizontal direction.

After the second insulating interlayer 25 is formed, third and fourth contacts 26a and 26b are formed through the second insulating interlayer 25 to be electrically connected to the third and fourth conductive patterns 20a and 20b, respectively. The third and fourth contacts 26a and 26b can be formed using the same conductive metal as that of the first and second contacts 16a and 16b.

Particularly, the third contacts 26a are formed on portions of the third conductive patterns 20a that are to be overlapped by fifth conductive patterns 30a (see FIG. 9) that are subsequently formed. In addition, the fourth contacts 26b are formed on portions of the fourth conductive patterns 20b that are to be overlapped by sixth conductive patterns 30b (see FIG. 9).

Referring to FIG. 9, fifth and sixth conductive patterns 30a and 30b are formed on the second insulating interlayer 25. For example, the fifth and sixth conductive patterns 30a and 30b may be formed using the same metal as that of the third and fifth conductive patterns 20a and 20b.

The fifth and sixth conductive patterns 30a and 30b extend in a fifth direction that lies at a second angle $\theta 2$ relative to the third direction. The fifth and sixth conductive patterns 30a and 30b are alternately arranged to be spaced apart from one another in a sixth direction rotated clockwise from the fifth direction by about 90° (see FIG. 3).

Here, the second angle $\theta 2$ may be between about 0° and about 90°. In addition, the fifth direction may lie at the second angle $\theta 2$ relative to the third direction in a clockwise direction. Alternatively, the fifth direction may lie at the second angle θ2 relative to the third direction in a counterclockwise direction.

In the present embodiment, a case where the fifth direction forms the second angle θ2 with the third direction in the clockwise direction is described for convenience of explanation. The fifth direction may be substantially the same as the second direction because, in the example given, the fifth direction is rotated clockwise from the third direction by about 45°.

The fifth and sixth conductive patterns 30a and 30b may have various shapes. For example, as illustrated in FIG. 9, the fifth and sixth conductive patterns 30a and 30b may have substantially bar shapes.

Here, the third conductive patterns 20a are electrically connected to the fifth conductive patterns 30a by the third contacts 26a (see FIG. 8). The fourth conductive patterns 20b are electrically connected to the sixth conductive patterns 30b by the fourth contacts 26b.

In an alternative embodiment, the third contacts 26a need not be formed. In this case, a fifth conductive line connected to end portions of the fifth conductive patterns 30a is formed. The fifth conductive line is then connected to the first conductive line 1a.

In addition, the fourth contacts 26b need not be formed. In this case, a sixth conductive line connected to end portions of the sixth conductive patterns 30b is formed. The sixth conductive line is then connected to the second conductive line 1b.

The third conductive patterns 20a are not electrically connected to the sixth conductive patterns 30a. The fourth conductive patterns 20b are not electrically connected to the fifth conductive patterns 30a. That is, the first, third and fifth conductive patterns 10a, 20a and 30a that are electrically connected to one another may form an electric group. In addition, the second, fourth and sixth conductive patterns 10b, 20b and 30b that are electrically connected to one another may form another electric group.

Figure 10:
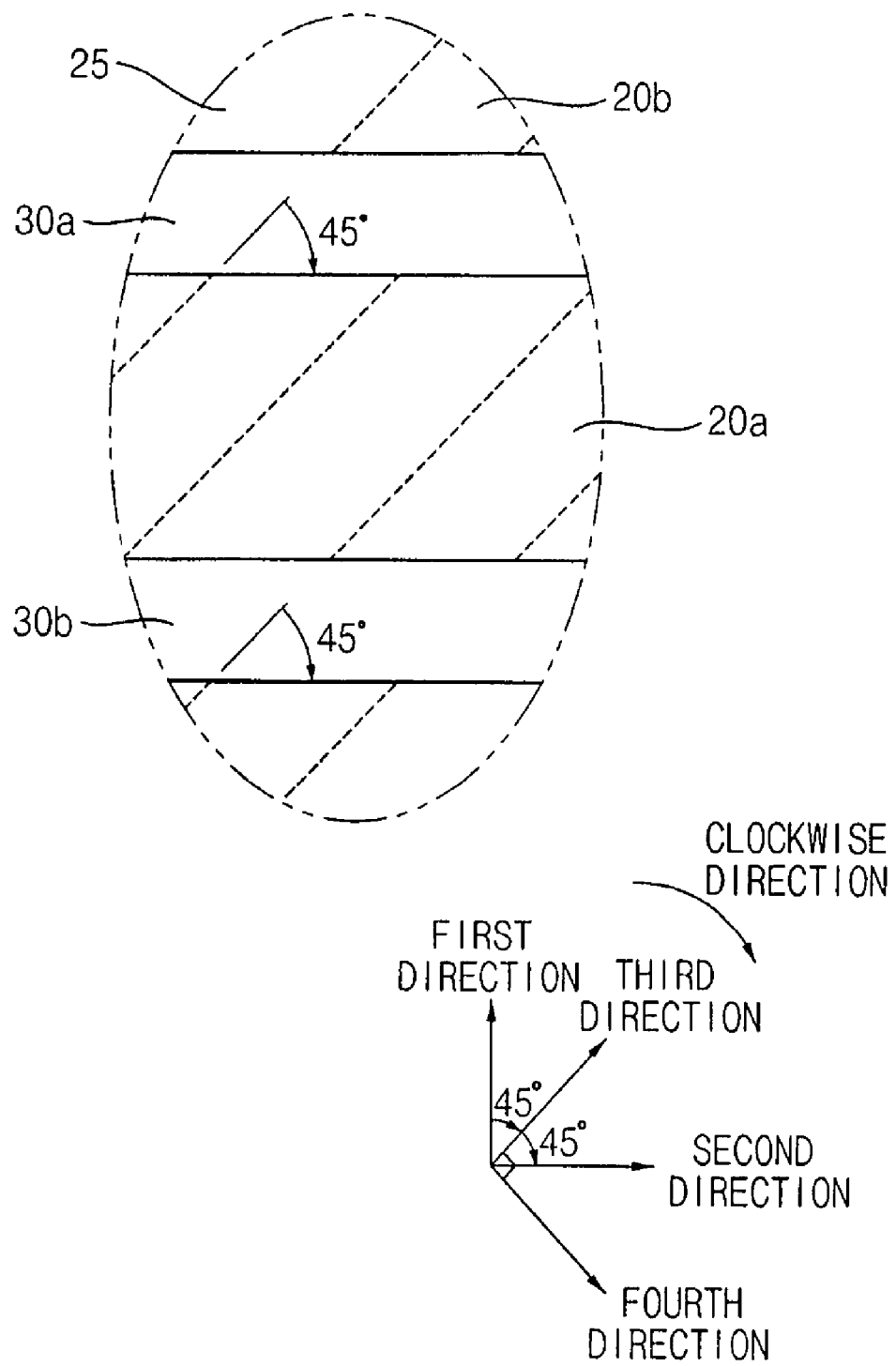

FIG. 10 is an enlarged view of "B" portion in FIG. 9.

Referring to FIG. 10, the second insulating interlayer 25 and the fourth conductive patterns 20b are subsequently located under the fifth conductive patterns 30a. The second insulating interlayer 25 and the second conductive patterns 20a are subsequently located under the sixth conductive patterns 30b.

As described above, the fifth conductive patterns 30a are electrically insulated from the fourth conductive patterns 20b. Thus, the fifth conductive patterns 30a, the second insulating interlayer 25 and the fourth conductive patterns 20b form a capacitor structure in a vertical direction. Also, the sixth conductive patterns 30b, the second insulating interlayer 25 and the third conductive patterns 20a form a capacitor structure in the vertical direction because the sixth conductive patterns 30b are electrically insulated from the third conductive patterns 20a.

Here, portions where the fifth conductive patterns 30a and the fourth conductive patterns 20b are overlapped and portions where the sixth conductive patterns 30b and the third conductive patterns 20a are overlapped may be shaped substantially like parallelograms other than a square and a rectangle because the third direction lies at the second angle θ2 relative to the fifth direction.

That is, the portion where the fifth conductive patterns 30a and the fourth conductive patterns 20b are overlapped and the portion where the sixth conductive patterns 30b and the third conductive patterns 20a are overlapped may be shaped like parallelograms having an acute interior angle. Here, the acute interior angle is the second angle θ2.

In the present embodiment, the acute interior angle of the parallelogram is about 45° because the fifth direction lies at about 45° relative to the third direction in a clockwise direction. The capacitance may be increased relative to a case where the overlapped portions are shaped substantially like the square and the rectangle because the overlapped portions are shaped substantially like the parallelogram having the acute interior angle, and therefore have a relatively greater area.

In the present embodiment as described, the conductive patterns are vertically stacked three times. In addition, the stacked conductive patterns are rotated by a predetermined angle with respect to the lower conductive patterns so that the shape of the overlapped portions becomes the parallelogram capable of increasing the capacitance. In other embodiments, the conductive patterns may be vertically stacked a number of times, for example, at least six times. In this case also, each time the conductive patterns are stacked, the stacked conductive patterns are rotated by the predetermined angle with respect to the lower conductive patterns.

According to embodiments of the present invention, the areas of portions where two conductive patterns forming a capacitor are overlapped may be increased. The capacitance of the capacitor may be substantially proportional to the areas of the overlapped portions, and thus the capacitance of the resulting capacitor can be increased.

In addition, each time the conductive patterns are vertically and repeatedly stacked, the stacked conductive patterns are rotated by a predetermined angle with respect to the lower conductive patterns. Thus, the number of capacitors may be increased, and/or the capacitance of the resulting capacitor is increased.

The foregoing embodiments are illustrative of the present invention, which should not be construed as being limiting thereof. Although a few embodiments of this invention have been described, those skilled in the art will readily appreciate that many modifications are possible in the embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A capacitor structure comprising:
a substrate;
first and second conductive patterns extending in a first direction on the substrate, the first and second conductive patterns being alternately arranged to be spaced apart from one another in a second direction substantially perpendicular to the first direction;
an insulating interlayer on the substrate to cover the first and second conductive patterns; and
third and fourth conductive patterns extending on the insulating interlayer in a third direction that lies at an angle of between about 0° and about 90° relative to the first direction, the third and fourth conductive patterns being alternately arranged to be spaced apart from one another in a fourth direction substantially perpendicular to the third direction.

2. The capacitor structure of claim 1, wherein the first conductive patterns are electrically connected to one another, and the second conductive patterns are electrically connected to one another.

3. The capacitor structure of claim 2, wherein the first conductive patterns are electrically connected to one another by a first conductive line connected to end portions of the first conductive patterns.

4. The capacitor structure of claim 2, wherein the second conductive patterns are electrically connected to one another by a second conductive line connected to end portions of the second conductive patterns.

5. The capacitor structure of claim 2, wherein the first conductive patterns are electrically connected to the third conductive patterns, and the second conductive patterns are electrically connected to the fourth conductive patterns.

6. The capacitor structure of claim 5, wherein the first and third conductive patterns are electrically connected to one another by first contacts formed between the first and third conductive patterns through the insulating interlayer.

7. The capacitor structure of claim 5, wherein the second and fourth conductive patterns are electrically connected to one another by second contacts formed between the second and fourth conductive patterns through the insulating interlayer.

8. The capacitor structure of claim 5, wherein the third conductive patterns are electrically connected to one another by a third conductive line connected to end portions of the third conductive patterns, the third conductive line being electrically connected to the first conductive line.

9. The capacitor structure of claim 5, wherein the fourth conductive patterns are electrically connected to one another by a fourth conductive line connected to end portions of the fourth conductive patterns, and the fourth conductive line electrically connected to the second conductive line.

10. The capacitor structure of claim 1, wherein the angle is about 45°, the first, second, third and fourth conductive patterns having substantially bar shapes.

11. The capacitor structure of claim 1, wherein the insulating interlayer and the third and fourth conductive patterns are subsequently and repeatedly stacked; and
wherein each time the third and fourth conductive patterns are stacked, the stacked conductive patterns are rotated by between about 0° and about 90° relative to conductive patterns on a neighboring lower level.

12. A method of manufacturing a capacitor structure, the method comprising:
forming first and second conductive patterns on a substrate, the first and second conductive patterns extending in a first direction, the first and second conductive patterns being alternately arranged to be spaced apart from one another in a second direction substantially perpendicular to the first direction;
forming an insulating interlayer on the substrate to cover the first and second conductive patterns; and
forming third and fourth conductive patterns on the insulating interlayer, the third and fourth conductive patterns extending in a third direction that lies at an angle of between about 0° and about 90° relative to the first direction, the third and fourth conductive patterns being alternately arranged to be spaced apart from one another in a fourth direction substantially perpendicular to the third direction.

13. The method of claim 12, further comprising:
integrally forming a first conductive line with the first conductive patterns such that the first conductive line is connected to end portions of the first conductive patterns.

14. The method of claim 13, further comprising subsequently and repeatedly stacking the insulating interlayer and the third and fourth conductive patterns; and
wherein each time the third and fourth conductive patterns are stacked, the stacked third and fourth conductive patterns are rotated by between about 0° and about 90° relative to conductive patterns on a neighboring lower level.

15. The method of claim 12, further comprising:
integrally forming a second conductive line with the second conductive patterns such that the second conductive line is connected to end portions of the second conductive patterns.

16. The method of claim 15, further comprising:
integrally forming a fourth conductive line with the fourth conductive patterns such that the fourth conductive line is electrically connected to end portions of the fourth conductive patterns; and
wherein the fourth conductive line is electrically connected to the second conductive line.

17. The method of claim 12, further comprising:
forming first contacts through the insulating interlayer such that the first contacts are connected between the first and third conductive patterns.

18. The method of claim 12, further comprising:
forming second contacts through the insulating interlayer such that the second contacts are connected between the second and fourth conductive patterns.

19. The method of claim 13, further comprising:
integrally forming a third conductive line with the third conductive patterns such that the third conductive line is connected to end portions of the third conductive patterns; and
wherein the third conductive line is electrically connected to the first conductive line.

20. The method of claim 12, wherein the angle is about 45°, the first, second, third and fourth conductive patterns having substantially bar shapes.

* * * * *